(12) United States Patent
Cabrera et al.

(10) Patent No.: US 11,292,587 B2
(45) Date of Patent: Apr. 5, 2022

(54) HINGELESS HELICOPTER ROTOR WITH HIGH STIFFNESS AND LOW DRAG CONFIGURATION

(71) Applicant: LOCKHEED MARTIN CORPORATION, Bethesda, MD (US)

(72) Inventors: Pedro L. Cabrera, West Haven, CT (US); David N. Schmaling, Southbury, CT (US); Kenneth F. Deyo, Thomaston, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 295 days.

(21) Appl. No.: 16/539,706

(22) Filed: Aug. 13, 2019

(65) Prior Publication Data

US 2021/0047024 A1 Feb. 18, 2021

(51) Int. Cl.
*B64C 27/10* (2006.01)
*B64C 11/10* (2006.01)

(52) U.S. Cl.
CPC .............. *B64C 27/10* (2013.01); *B64C 11/10* (2013.01)

(58) Field of Classification Search
CPC ......... B64C 11/02; B64C 11/04; B64C 11/06; B64C 11/08; B64C 11/10; B64C 27/10; B64C 27/04; B64C 27/06; B64C 27/08; B64C 27/32; B64C 27/37; B64C 27/48; B64C 27/39
See application file for complete search history.

(56) References Cited

U.S. PATENT DOCUMENTS

| | | | |
|---|---|---|---|
| 4,297,078 A | 10/1981 | Martin | |
| 4,306,836 A * | 12/1981 | Mayerjak | ................ B64C 27/32 416/134 A |
| 4,361,415 A | 11/1982 | Aubry | |
| 5,165,853 A | 11/1992 | Pancotti | |
| 8,876,057 B2 * | 11/2014 | Alber | .................... B64C 39/024 244/137.1 |
| 9,896,198 B2 | 2/2018 | Davis et al. | |

* cited by examiner

*Primary Examiner* — Richard A Edgar
(74) *Attorney, Agent, or Firm* — Foley & Lardner LLP

(57) ABSTRACT

A hub assembly for a rotary wing aircraft having a rotor shaft which rotates about a rotational axis includes: a hub extender arm coupled to the rotor shaft; a pitch bearing that is disposed within and connected to the hub extender arm; and a rotor blade assembly having an inboard section disposed within the hub extender arm and connected to the pitch bearing; wherein the hub extender arm has an inboard cross-sectional area where coupled to the rotor shaft that is greater than an outboard cross-sectional area where coupled to the pitch bearing.

18 Claims, 9 Drawing Sheets

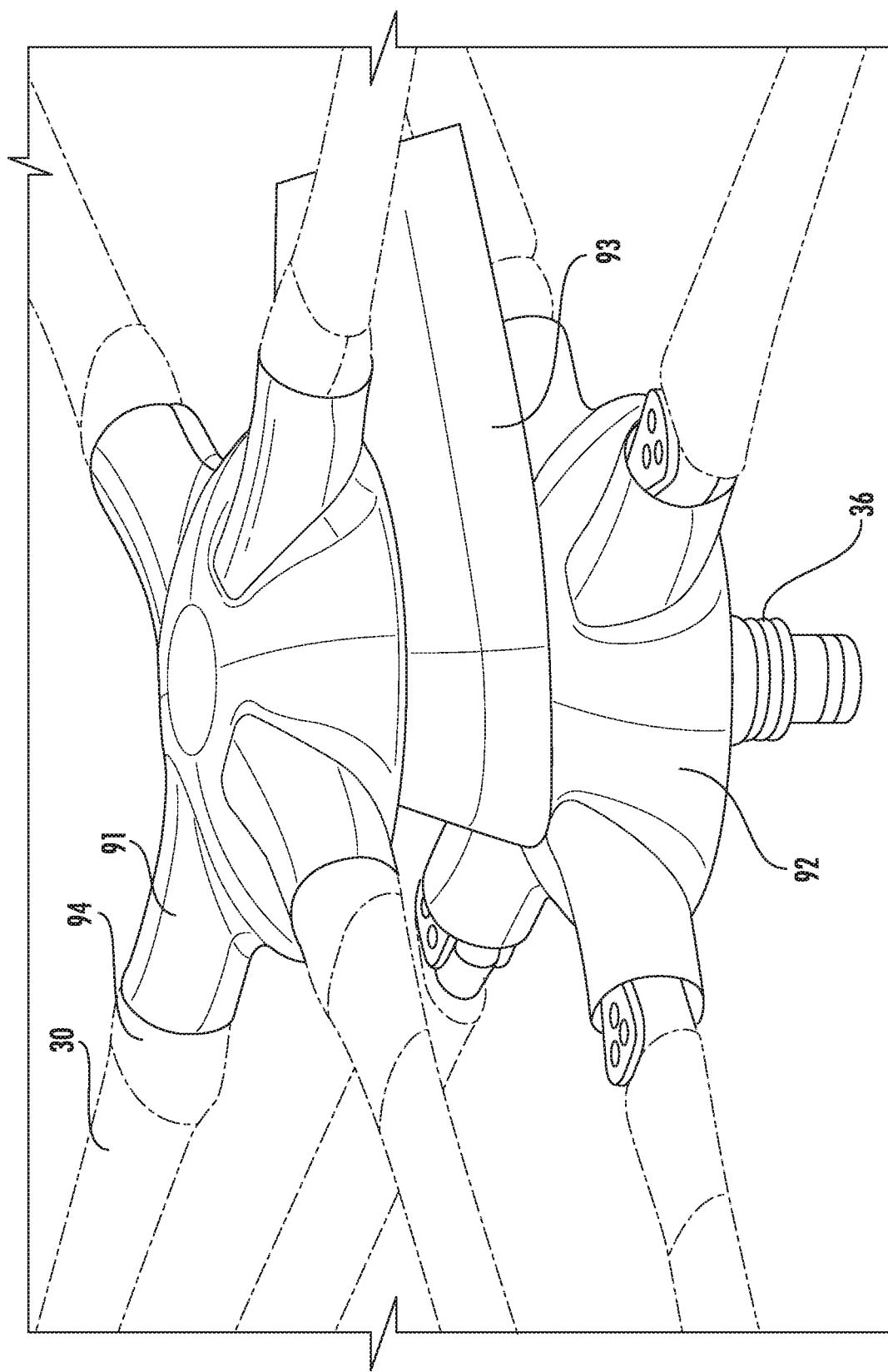

HINGELESS HELICOPTER ROTOR WITH HIGH STIFFNESS AND LOW DRAG CONFIGURATION

BACKGROUND

The embodiments disclosed herein relate to a connection of rotor of a rotary wing aircraft to a rotor hub assembly, and more particularly to the connection having high stiffness and low aerodynamic drag.

The flight capabilities of rotary-wing aircrafts make them effective for a wide variety of missions due to their ability to take-off and land vertically in addition to their ability to hover. The rotating blades necessary for these abilities, however, require that their connections to a rotor shaft be able to withstand high centrifugal forces as the blades rotate, be able to change the pitch of the blades as they rotate, be able to achieve high bending stiffness, as well as provide low aerodynamic drag. Existing connections that can withstand the centrifugal forces present a larger than desired cross-sectional area that is susceptible to drag, thereby decreasing the efficiency of the rotary wing aircraft in flight.

BRIEF DESCRIPTION

Disclosed is a hub assembly for a rotary wing aircraft having a rotor shaft which rotates about a rotational axis. The hub assembly includes: a hub extender arm coupled to the rotor shaft; a pitch bearing that is disposed within and connected to the hub extender arm; and a rotor blade assembly having an inboard section disposed within the hub extender arm and connected to the pitch bearing; wherein the hub extender arm has an inboard cross-sectional area where coupled to the rotor shaft that is greater than an outboard cross-sectional area where coupled to the pitch bearing.

Also disclosed is a rotary wing aircraft. The rotary wing aircraft includes: an airframe; a gear box coupled to the airframe; a rotor shaft coupled to the gear box; a hub extender arm coupled to the rotor shaft; a pitch bearing that is disposed within and connected to the hub extender arm; and a rotor blade assembly having an inboard section disposed within the hub extender arm and connected to the pitch bearing; wherein the hub extender arm has an inboard cross-sectional area where coupled to the rotor shaft that is greater than an outboard cross-sectional area where coupled to the pitch bearing.

BRIEF DESCRIPTION OF THE DRAWINGS

The following descriptions should not be considered limiting in any way. With reference to the accompanying drawings, like elements are numbered alike:

FIG. 9 is a perspective view of the rigid rotor system covered with aerodynamic fairings.

DETAILED DESCRIPTION

A detailed description of one or more embodiments of the disclosed apparatus and method are presented herein by way of exemplification and not limitation with reference to the Figures.

Figure 1:
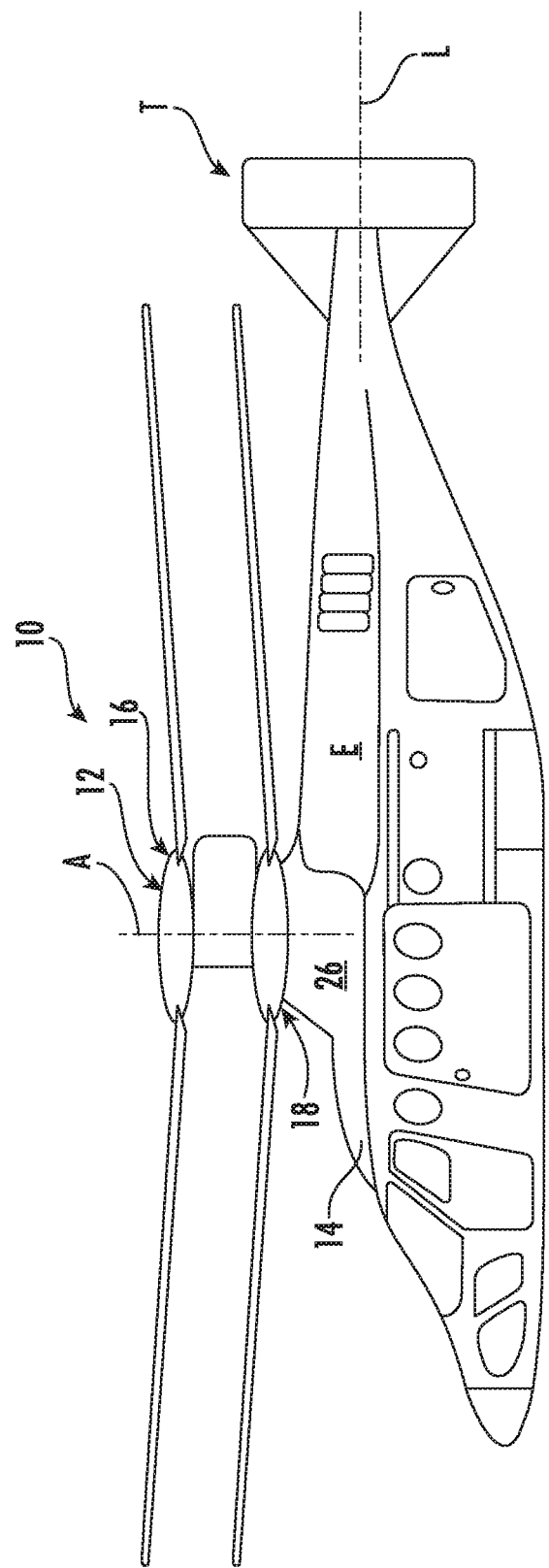
FIG. 1 is a perspective view of a rotary wing aircraft having a rigid rotor system.

FIG. 1 illustrates an exemplary vertical takeoff and landing (VTOL) rotary-wing aircraft 10 having a dual, counter-rotating, coaxial rotor system 12 which rotates about an axis of rotation A. The aircraft 10 includes an airframe 14 which supports the dual, counter rotating, coaxial rotor system 12 as well as an optional translational thrust system T which provides translational thrust generally parallel to an aircraft longitudinal axis L. Although a particular aircraft configuration is illustrated in the disclosed embodiment, other counter-rotating, coaxial rotor systems will also benefit from the present invention. In one or more embodiments, the coaxial rotor system 12 is a rigid rotor system (i.e., hingeless) in which mechanical components enable each rotor blade of the rotor system to change pitch as the blades rotate. The rigid rotor system in general does not include mechanical components for enabling flap movement and lead/lag movement of the blades. Any flap movement or lead/lag movement is due to bending of the blades.

A main gearbox 26, which may be located above the aircraft cabin, drives the rotor system 12. The translational thrust system T may be driven by the same main gearbox 26 which drives the rotor system 12. The main gearbox 26 is driven by one or more engines (illustrated schematically at E). As shown, the main gearbox 26 may be interposed between the gas turbine engines E, the rotor system 12 and the translational thrust system T.

Figure 2:
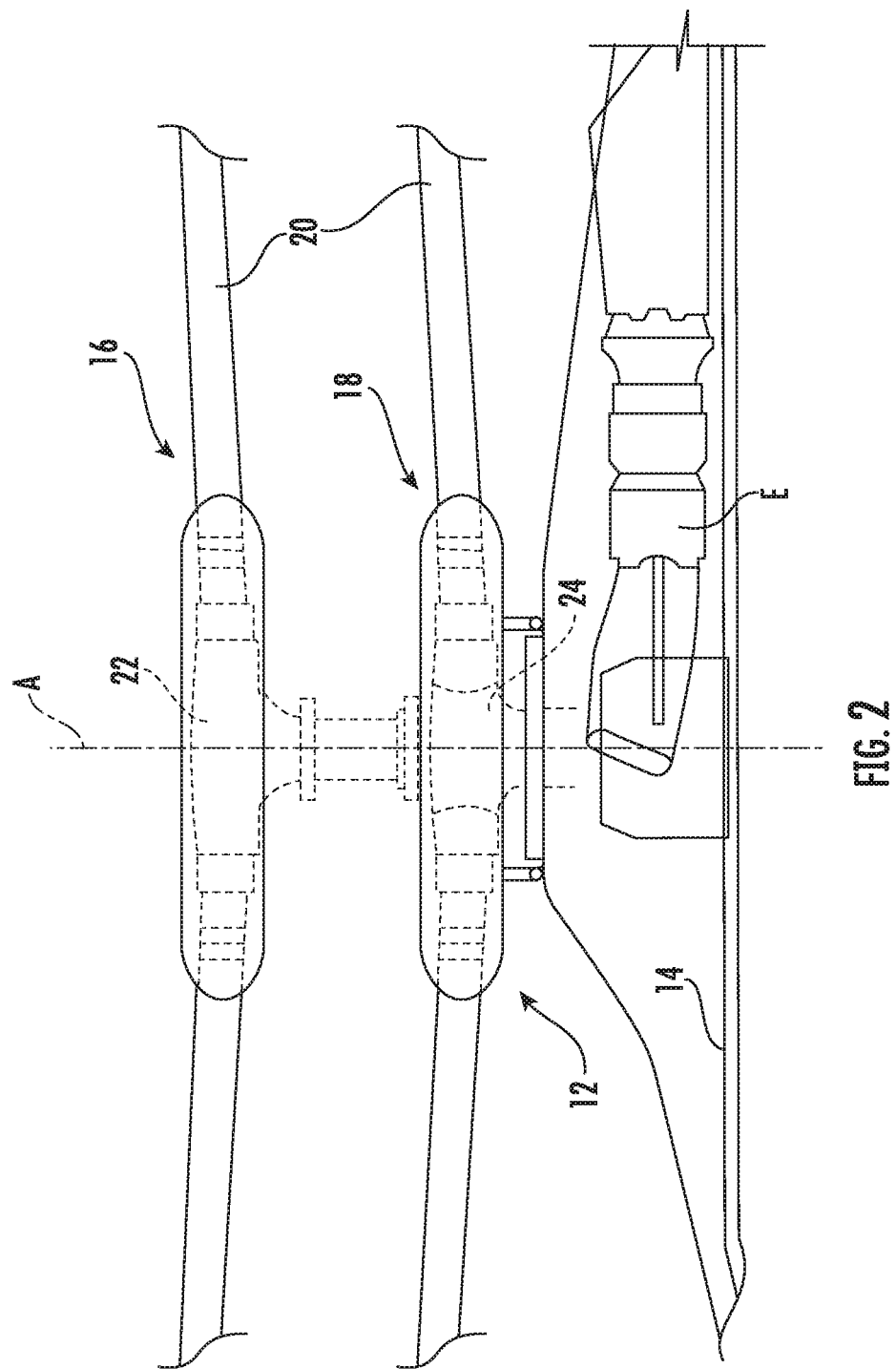
FIG. 2 is a detailed view of the rigid rotor system having a rotor hub assembly.

Referring to FIG. 2, the dual, counter-rotating, coaxial rotor system 12 includes an upper rotor system 16 and a lower rotor system 18. Each rotor system 16, 18 includes a plurality of rotor blade assemblies 20 mounted to a rotor hub assembly 22, 24 for rotation about a rotor axis of rotation A. The shown upper rotor system 16 and lower rotor system 18 include corresponding hub fairings which surround and reduce drag for the rotor hub assembly 22, 24. A plurality of the main rotor blade assemblies 20 project radially outward from the hub assemblies 22, 24. Any number of main rotor blade assemblies 20 may be used with the rotor system 12. While not shown, a fairing may be disposed between upper rotor system 16 and lower rotor system 18 to reduce drag in this region.

Figure 3:
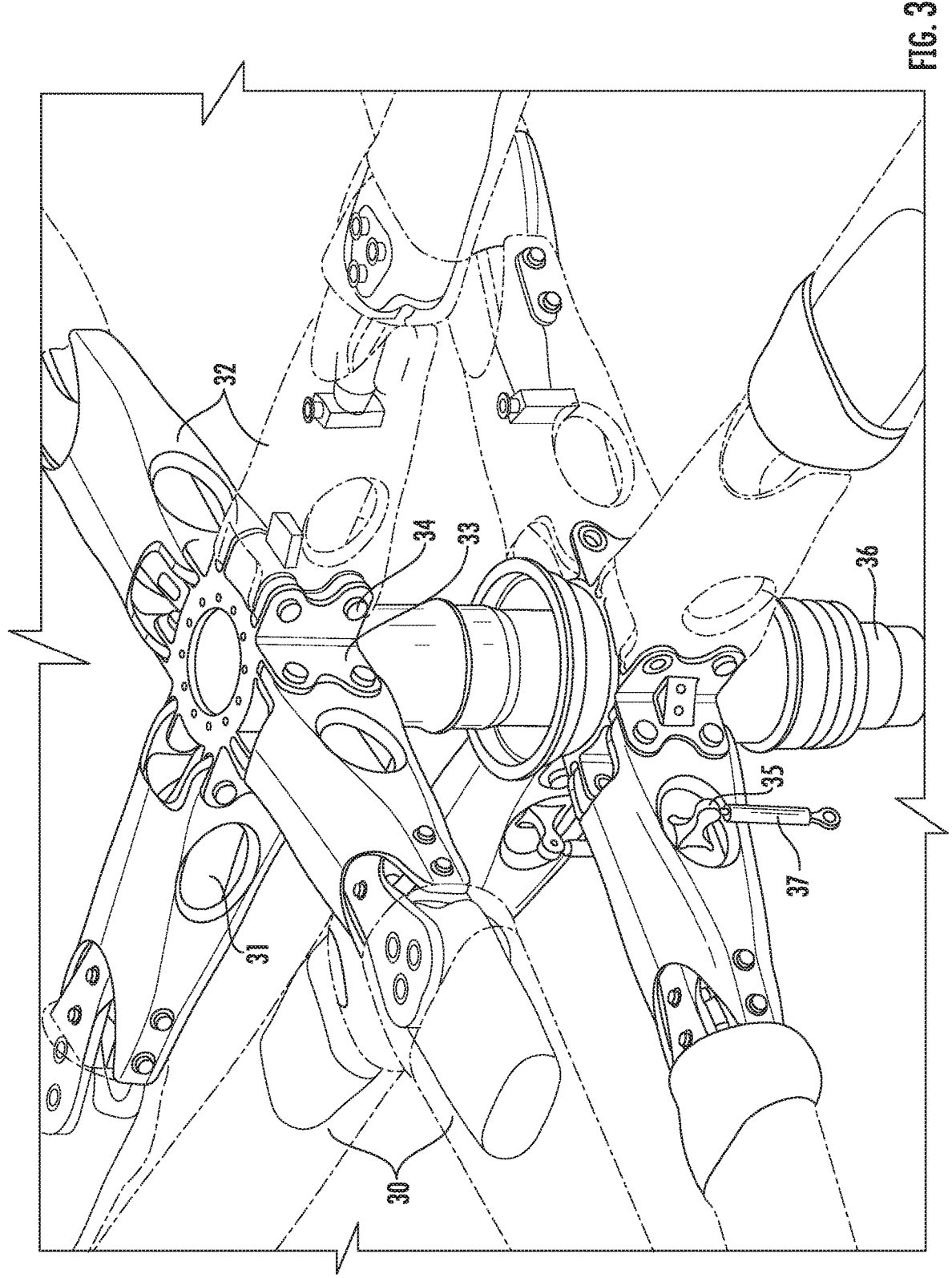
FIG. 3 is a perspective view of the rigid rotor system.
Figure 4:
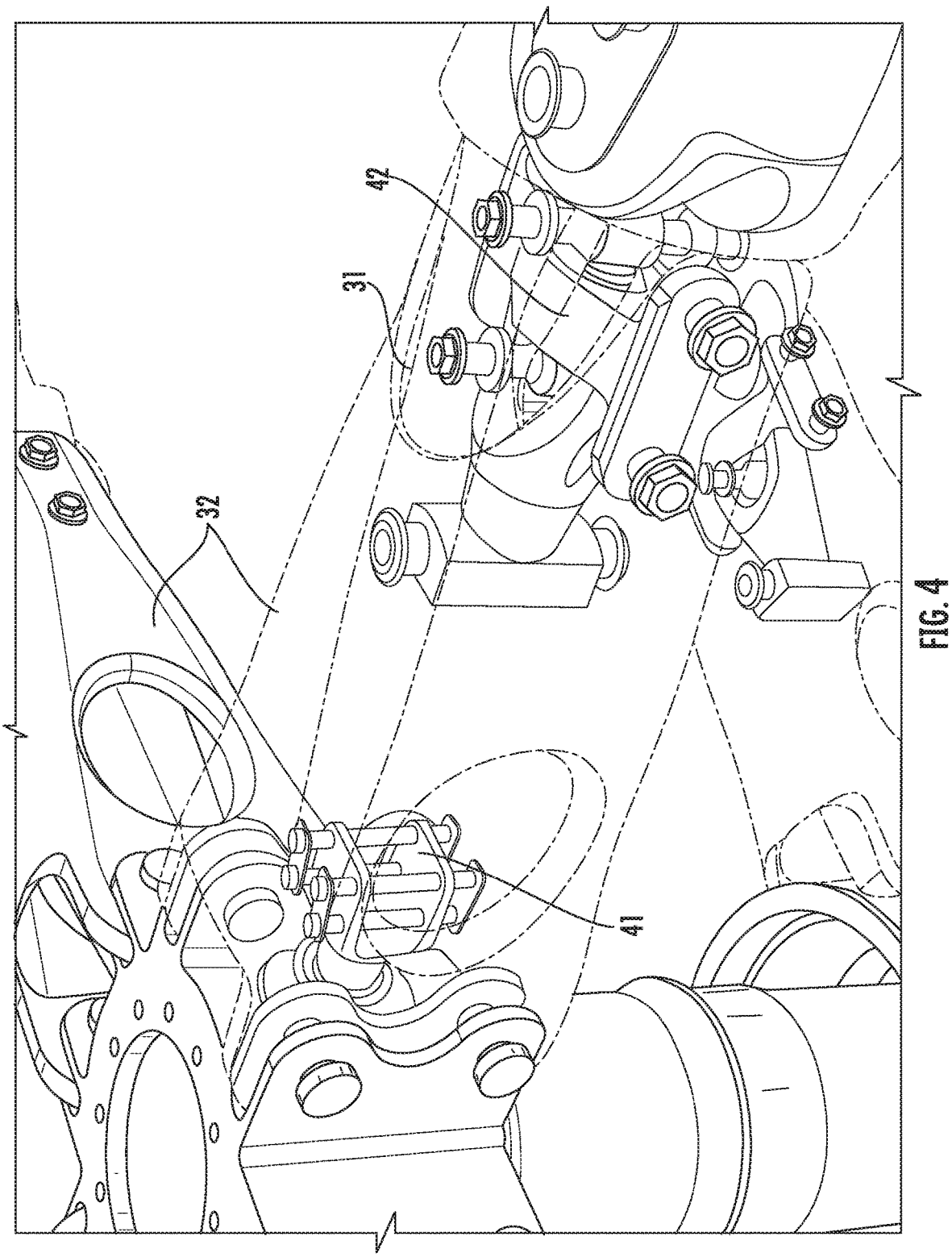
FIG. 4 is a perspective view of a hub extender arm connected to a rotor blade assembly.

Referring now to FIGS. 3 and 4, at least one of the rotor blade assemblies 20 of the rotor system 12 includes a rotor blade 30 and a blade grip 31. A rotor shaft 36 rotates to rotate the rotor hub assemblies 22, 24. In the illustrated non-limiting embodiment, the main rotor system 12 is a rigid rotor system. A hub arm extender 32 extends from the rotor shaft 36. The rotor shaft 36 includes a hub arm extender connector 33 to connect the hub arm extender 32 to the rotor shaft 36. In one or more embodiments, the connector 33 uses bolts 34 to connect to the hub arm extender 32 and shaft 36. The hub extender 32 includes upper, lower, and side walls that define an inboard end opening and an outboard end opening. The upper wall is the wall farthest from the fuselage 14 along the axis of rotation A for the shaft 36, and the lower wall is between the upper wall and the fuselage 14 along the axis of rotation A for the shaft 36. The blade grip 31 is disposed inside the hub arm extender 32 and attached to an inner race of one or more pitch bearings 41, 42 that enables the blade grip 31 and thus the rotor blade 30 to change pitch about a pitch axis as the rotor blade 30 rotates about the rotational axis A. In one or more embodiments, the blade grip 31 is coupled to the rotor blade 30 just outside of the hub extender arm 32. The term "inboard" relates to closest to the rotor shaft 36, while the term "outboard" relates to being further away from the rotor shaft 36. An outer race of the pitch bearings 41, 42 in turn is attached to the hub arm extender 32 or the rotor shaft 36. A lower pitch horn 35 is attached to the blade grip 31 in order to control the pitch of the blade 30 as it rotates about the rotational axis A. A pitch control rod 37 is connected to the lower pitch horn 35. In one or more embodiments, an end of the pitch control rod 37 is coupled to a swashplate (not shown) to provide the appropriate pitch control inputs.

FIG. 4 is a perspective view of the hub extender arm 32 connected to the blade grip 31. In the embodiment of FIG. 4, the blade grip 31 is disposed within the hub arm extender 32 and is connected to an inboard pitch bearing 41 and an outboard pitch bearing 42. The pitch bearings 41 and 42 enable the blade 30 to change pitch as the blade 30 rotates about the rotational axis A and also provide the necessary centripetal force to keep the blade assembly 20 attached to the hub arm extender 32 and thus to the rotor shaft 31 as the rotor blade 30 rotates.

The rotary-wing aircraft 10 requires high flap-wise stiffness (e.g., up and down stiffness with respect to horizontal flight of the rotary-wing aircraft 10) to decrease unwanted vibrations during flight and also requires low aerodynamic drag of the rotor hub assembly 22, 24 to increase efficiency. Typically, these two requirements are in direct conflict with one another. However, disposing the blade grip 31 within the hub extender arm 32 as disclosed herein provides for the needed high flap-wise stiffness to decrease unwanted vibrations during flight and at the same time lower the cross-sectional area of the rotor hub assembly 22, 24 in order to decrease aerodynamic drag. In aspects of the invention, the rotor hub assembly 22, 24 can be designed to be as stiff as required while the height of the rotor hub assembly 22, 24 can be minimized. The flapping stiffness of the rotor blade assembly 20 is primarily driven by stiffness of the stationary (with respect to the rotor shaft 36) hub extender arm 32 and the pitching blade grip 31. These two components in one or more embodiments are connected to one another via two pitch bearings 41, 42 (one inboard and one outboard). The embodiments of the rotor hub assembly 22, 24 configuration as disclosed herein resolves the conflicting requirement of high stiffness and low drag by recognizing that the hub extender arm 32 and the blade grip 31 react the rotor blade 30 loads in different manners. The blade grip 31 is exposed to the highest blade bending moment at the outboard attachment and the moment decreases inboard reaching zero at the inboard pitch bearing 41. From a structures perspective, the blade grip 31 behaves as cantilever beam where a shear load is applied at the inboard end and it is fixed at the outboard end. On the other hand, the moment carried by the hub extender arm 32 starts at zero at the outboard pitch bearing 42 and grows in magnitude to a maximum value at the inboard pitch bearing 41. As a structure, it acts as a cantilever beam with a shear load applied at the outboard pitch bearing 42 and it is fixed at the inboard bearing 41. The fact that the moments carried by these two components peak at opposite ends allow for a nested design where one part can get bigger without driving the size of the other part.

In other designs, the blade grip goes over the hub extender arm. This means that as the hub extender arm gets bigger inboard to achieve the higher stiffness the blade grip must get bigger to clear the hub extender arm. This arrangement results in an inefficient structure since the moment carried by the blade grip dictates the blade grip tube should be smaller inboard not bigger. This has resulted in a design that either does not meet the stiffness requirement or has a taller hub than is required to carry the loads and thus has increased aerodynamic drag at the hub assembly.

Figure 5:
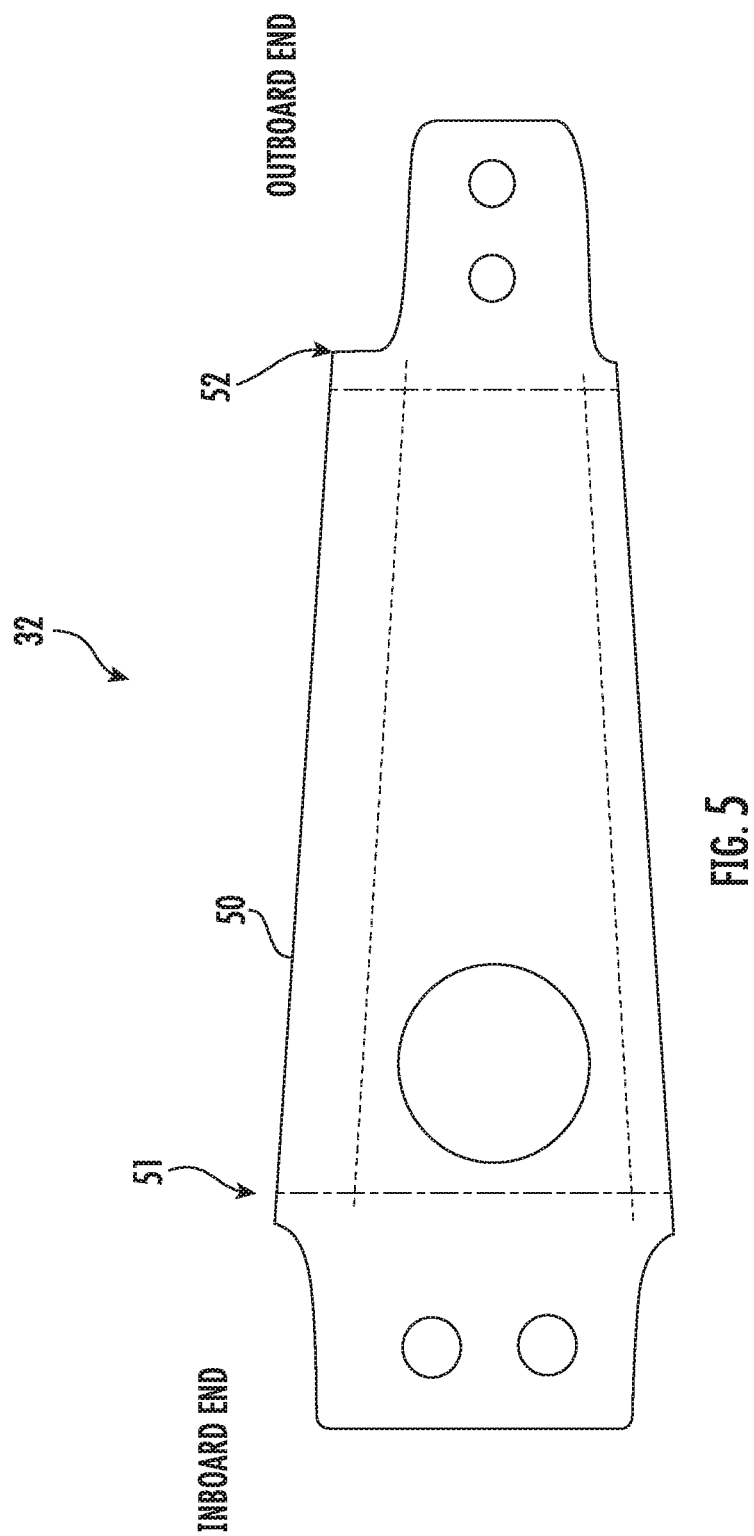
FIG. 5 is a side view of the hub extender arm having box walls.

According to aspects of the invention, the rotor hub assembly 22, 24 allows a rotor design with high flatwise stiffness while minimizing the drag of the rotor hub assembly 22, 24. This design takes advantage of the fact that the hub extender arm 32 and the blade grip 31 carry the rotor blade 30 loads in different manners. It recognizes that from a structures perspective the hub extender arm 32 can start with a small cross section outboard and become larger as the cross-section moves inboard. On the other hand, the blade grip 31 can start with a large cross section outboard and get smaller as the cross-section moves inboard. The fact that the two structures are exposed to moments that increase in opposite directions allows for a nested design with the attributes of high flap-wise stiffness and minimized rotor hub assembly 22, 24 height and drag. In FIG. 5, a cross-sectional area of the hub extender arm 32 (that includes structural box walls 50) in a plane that is perpendicular to a longitudinal axis of the hub extender arm 32 at 51 (i.e., inboard plane) is greater than the cross-sectional area of that hub extender arm 32 in a plane at 52 (i.e., outboard plane). Assuming that the structural box walls 50 have uniform thickness, the larger cross-sectional area provides for more flap-wise stiffness than the smaller cross-sectional area. Conversely, the blade grip 31 can have a smaller cross-sectional area towards the inboard end of the blade grip 31 relative to the cross-sectional area towards the outboard end of the blade grip 31 assuming uniform thickness of a longitudinal structural element of the blade grip 31. The varied cross-sectional areas of both the hub extender arm 32 and the blade grip 31 provides the advantage of reducing the weight of these components and increasing the efficiency of the rotary-wing aircraft 10. In one or more embodiments, the hub extender arm 32 has a cross-sectional area in a first inboard plane that is greater than or equal to a cross-sectional area in a first outboard plane and/or the inboard section of the rotor blade assembly 20 has a cross-sectional area in a second inboard plane that is less than or equal to a cross-sectional area in a second outboard plane. In one or more embodiments, the inboard and outboard planes perpendicular to the longitudinal axis of the inboard section of the rotor blade assembly 20. In one or more embodiments, the hub extender arm 32 has an inboard cross-sectional area where coupled to the rotor shaft 36 that is greater than an outboard cross-sectional area where coupled to the pitch bearing 42.

According to aspects of the invention, the hub extender arm 32 and/or the blade grip 31 can be made of a composite material such as an aramid fiber (e.g., poly-paraphenylene terephthalamide commonly known as Kevlar®) or a graphite/epoxy combination to provide strength and light weight. In addition, making these components with a composite material enables the cross-sectional area and/or thickness of structural elements to be varied or fine-tuned so that the flap-wise stiffness of these components complements each other in the nested configuration.

Figure 6:
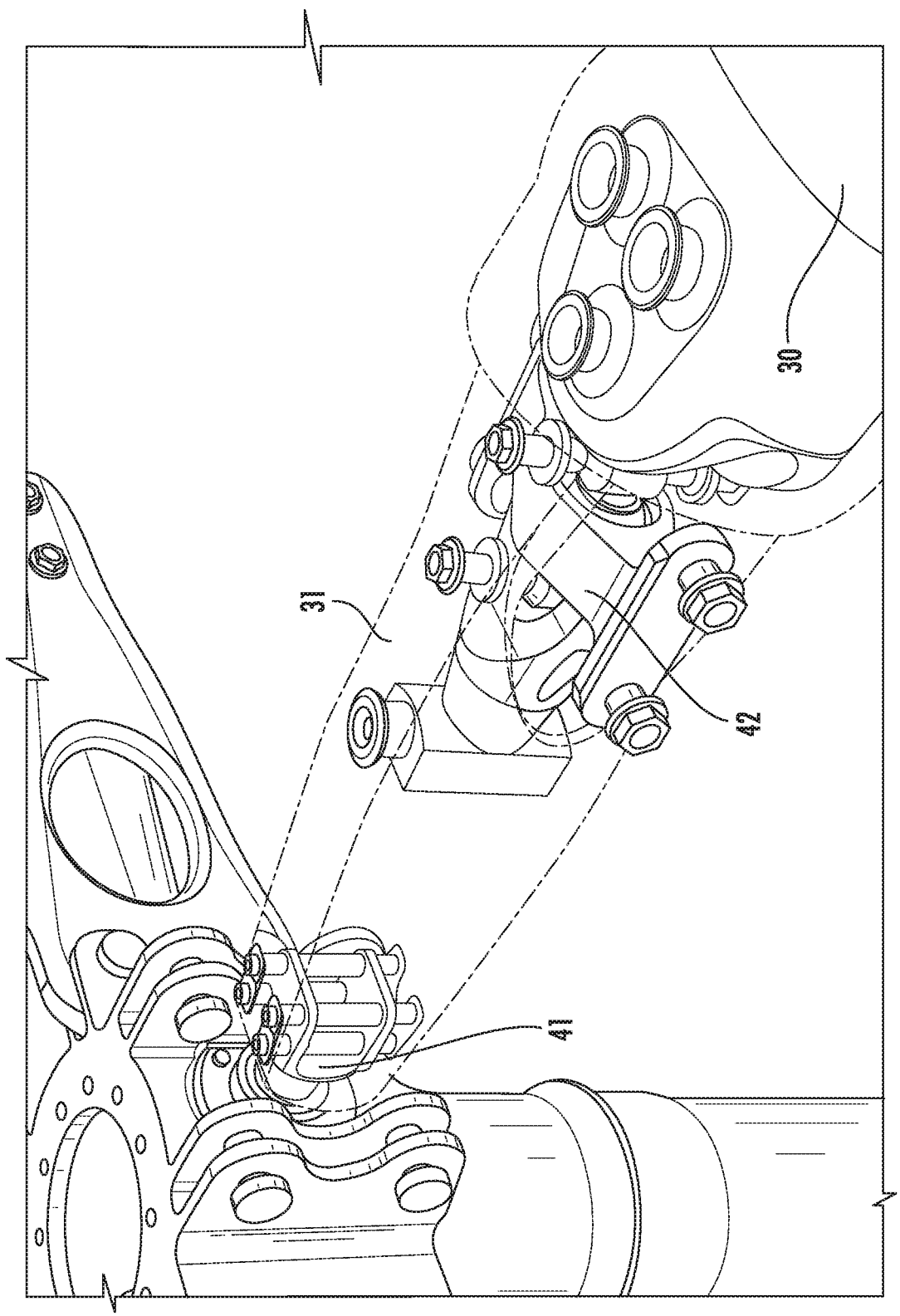
FIG. 6 is a perspective view of a blade grip.

FIG. 6 is a perspective view of the blade grip 31 that is disposed inside of the hub extender arm 32 without being obscured by the hub extender arm 32.

Figure 7:
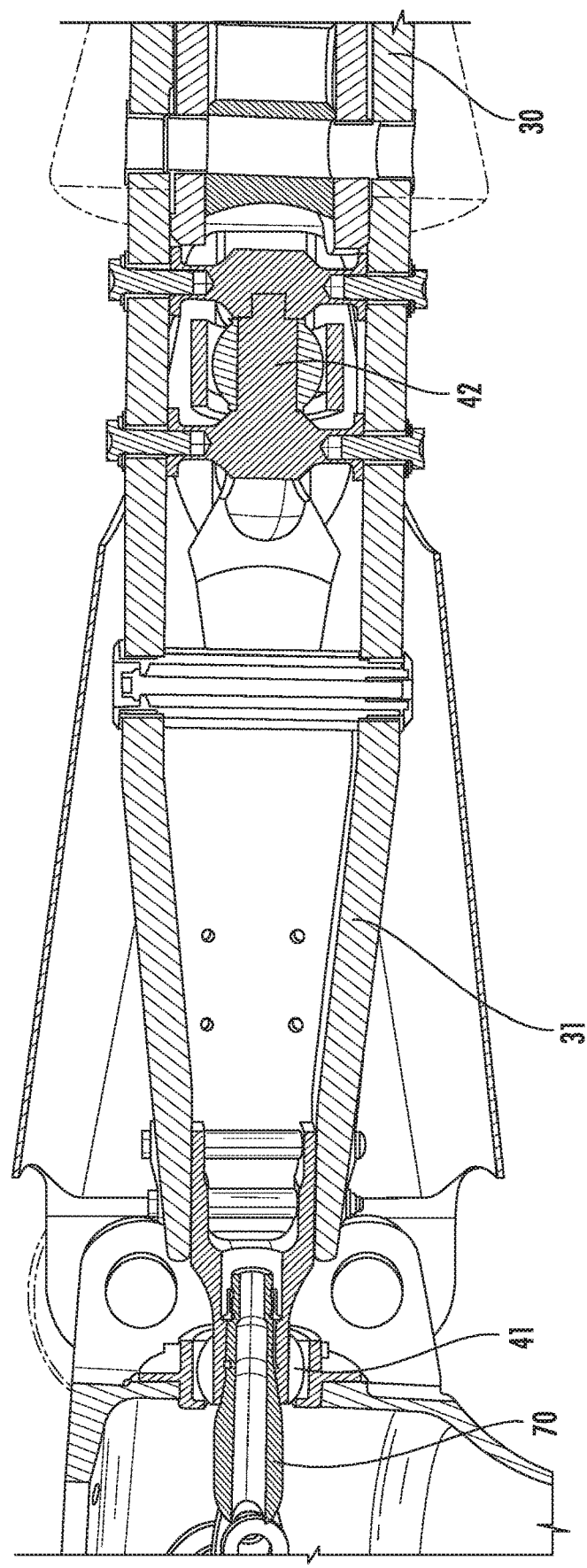
FIG. 7 is a side cross-sectional view of an upper blade grip disposed inside of the hub extender arm.

FIG. 7 is a side cross-sectional view of the blade grip 31 for the upper rotor system 16 disposed inside of the hub extender arm 32. The embodiment of FIG. 7 includes an upper pitch horn 70 for changing the pitch of the blade grip 31 for the upper rotor system 16 and thus the pitch of the rotor blade 30 as the blade 30 rotates. The upper pitch horn 70 extends into an interior space of the rotor shaft 36 and is attached to an inboard pitch control linkage (not shown) in that interior space.

Figure 8:
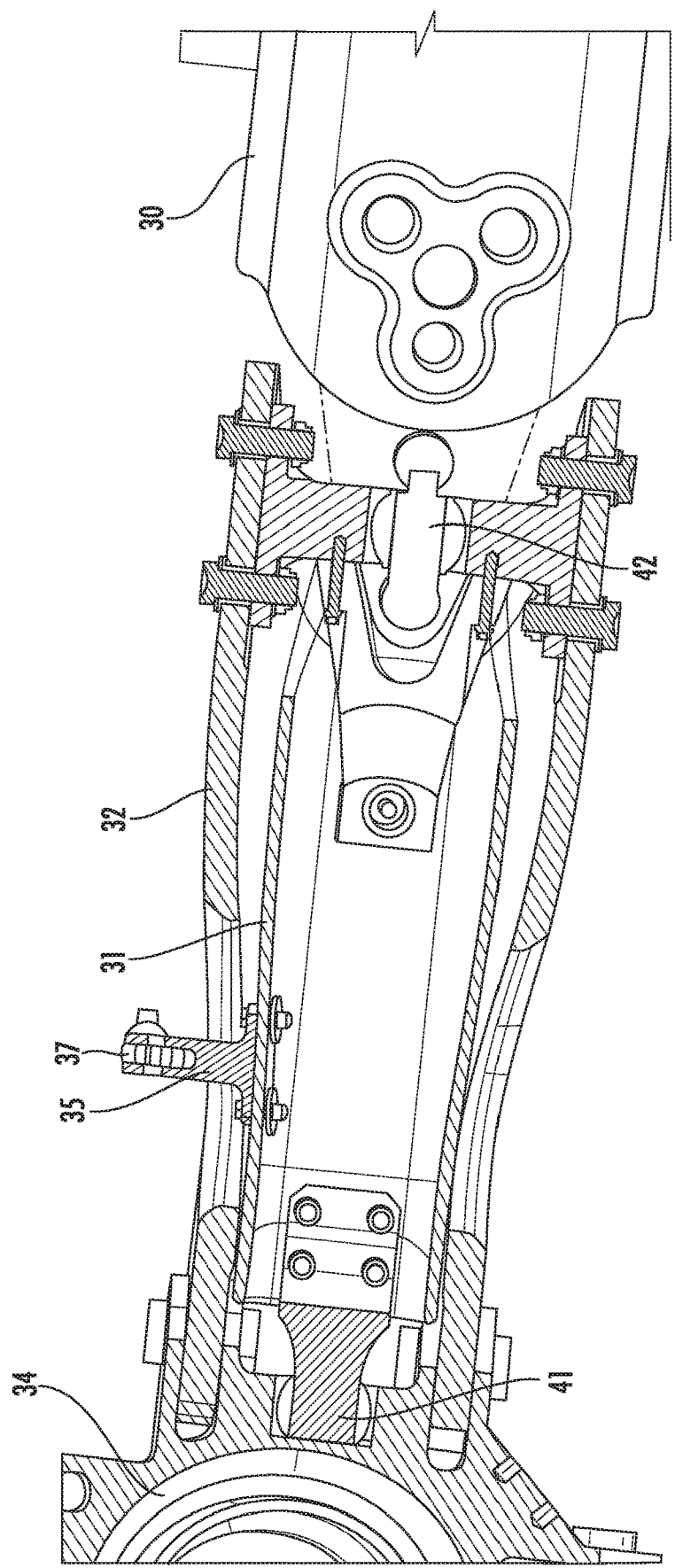
FIG. 8 is a top cross-sectional view of a lower blade grip disposed inside of the hub extender arm.

FIG. 8 is a top cross-sectional view of the blade grip 31 that is disposed inside of the hub extender arm 32 for the lower rotor system 18. In the embodiment of FIG. 8, a lower pitch horn 35 for the lower rotor system 18 is disposed external to the rotor shaft 36. The lower pitch horn 35 is configured for changing the pitch of the blade grip 31 for the lower rotor system 18 and thus the pitch of the rotor blade 30 as the blade 30 rotates. As illustrated in FIG. 8, the lower pitch horn 35 is attached to the pitch control rod 37.

FIG. 9 is a perspective view of the rigid rotor system 12 covered with aerodynamic fairings. An upper hub fairing 91 covers and may be coupled to the upper hub assembly 22 and a lower hub fairing 92 covers and may be coupled to the lower hub assembly 24 such that there is no relative motion between the fairings 91, 92 and the hub assemblies 22, 24, respectively. The height of each of the hub fairings 91 and 92 is reduced because each of the rotors 30 is disposed into the corresponding hub extender arm 32. Because the height of the fairings 91 and 92 is reduced, the aerodynamic drag of the fairings 91 and 92 is also reduced thereby increasing the efficiency of the rotary-wing aircraft 10. To further decrease aerodynamic drag, a middle fairing 93 is disposed about the rotor shaft 36 between the upper fairing 91 and the lower fairing 92. Aerodynamic drag may further be reduced by an interface fairing 94 coupled to each rotor blade 30 and a tip or edge of each corresponding hub fairing.

Elements of the embodiments have been introduced w either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured. The terms "first" and "second" do not denote a specific order but are intended to distinguish elements.

The disclosure illustratively disclosed herein may be practiced in the absence of any element which is not specifically disclosed herein.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hub assembly for a rotary wing aircraft having a rotor shaft which rotates about a rotational axis, the hub assembly comprising:
    a hub extender arm coupled to the rotor shaft;
    at least one pitch bearing that is disposed within and connected to the hub extender arm; and
    a rotor blade assembly having an inboard section disposed within the hub extender arm and connected to the at least one pitch bearing;
    wherein the hub extender arm has an inboard cross-sectional area where coupled to the rotor shaft that is greater than an outboard cross-sectional area where coupled to the at least one pitch bearing, and
    wherein the rotor blade assembly has an outboard cross-sectional area at an outboard end of the hub extender arm that is greater than an inboard cross-sectional area at an inboard end of the hub extender arm.

2. A hub assembly for a rotary wing aircraft having a rotor shaft which rotates about a rotational axis, the hub assembly comprising:
    a hub extender arm coupled to the rotor shaft;
    at least one pitch bearing that is disposed within and connected to the hub extender arm; and
    a rotor blade assembly having an inboard section disposed within the hub extender arm and connected to the at least one pitch bearing,
    wherein the hub extender arm has an inboard cross-sectional area where coupled to the rotor shaft that is greater than an outboard cross-sectional area where coupled to the at least one pitch bearing, and
    wherein the rotor blade assembly comprises a blade grip coupled to a rotor blade and at least a portion of the blade grip is disposed within the hub extender arm.

3. The hub assembly according to claim 2, wherein at least one of the hub extender arm and the blade grip comprises an aramid fiber and/or a graphite and epoxy combination.

4. The hub assembly according to claim 2, further comprising a pitch horn for controlling the pitch of the rotor blade.

5. The hub assembly according to claim 4, wherein the hub assembly comprises an upper hub assembly having an upper hub extender arm and an upper rotor blade assembly and a lower hub assembly having a lower hub extender arm and a lower rotor blade assembly.

6. The hub assembly according to claim 5, wherein the pitch horn of the lower blade assembly is coupled to the blade grip and disposed in an opening in the lower hub extender arm.

7. The hub assembly according to claim 5, wherein the pitch horn of the upper blade assembly is coupled to the at least one pitch bearing and disposed within the rotor shaft.

8. The hub assembly according to claim 7, wherein the at least one pitch bearing comprises:
    an inboard pitch bearing disposed within the hub extender arm and coupled to the hub extender arm and the blade grip; and
    an outboard pitch bearing disposed within the hub extender arm and coupled to the hub extender arm and the blade grip.

9. The hub assembly according to claim 8, wherein the pitch horn of the upper blade assembly is coupled to the inboard pitch bearing.

10. The hub assembly according to claim 5, further comprising an upper fairing covering the upper hub extender arm and a lower fairing covering the lower hub extender arm.

11. The hub assembly according to claim 10, further comprising a middle fairing disposed between the upper fairing and the lower fairing and surrounding the rotor shaft.

12. The hub assembly according to claim 11, further comprising an interface fairing coupled to each of the upper and lower fairings and a corresponding rotor blade of the rotor blade assembly.

13. The hub assembly according to claim 1, wherein the rotary wing aircraft comprises a rigid rotor system.

14. A rotary wing aircraft comprising:
an airframe;
a gear box coupled to the airframe;
a rotor shaft coupled to the gear box;
a hub extender arm coupled to the rotor shaft;
at least one pitch bearing that is disposed within and connected to the hub extender arm; and
a rotor blade assembly having an inboard section disposed within the hub extender arm and connected to the at least one pitch bearing;
wherein the hub extender arm has an inboard cross-sectional area where coupled to the rotor shaft that is greater than an outboard cross-sectional area where coupled to the at least one pitch bearing, and
wherein the rotor blade assembly has an outboard cross-sectional area at an outboard end of the hub extender arm that is greater than an inboard cross-sectional area at an inboard end of the hub extender arm.

15. The rotary wing aircraft according to claim 14, wherein the rotor blade assembly comprises a blade grip coupled to a rotor blade and at least a portion of the blade grip is disposed within the hub extender arm.

16. The rotary wing aircraft according to claim 15, wherein at least one of the hub extender arm and the blade grip comprises an aramid fiber and/or a graphite and epoxy combination.

17. The rotary wing aircraft according to claim 14, wherein the hub assembly comprises an upper hub assembly having an upper hub extender arm and an upper rotor blade assembly and a lower hub assembly having a lower hub extender arm and a lower rotor blade assembly.

18. The rotary wing aircraft according to claim 15, wherein the at least one pitch bearing comprises:
an inboard pitch bearing disposed within the hub extender arm and coupled to the hub extender arm and the blade grip; and
an outboard pitch bearing disposed within the hub extender arm and coupled to the hub extender arm and the blade grip.

\* \* \* \* \*